United States Patent [19]

Timmons et al.

[11] 4,205,744
[45] Jun. 3, 1980

[54] DEVICE FOR TURNING OVER AND FOR TRANSFERRING A GLASS BRACKET

[75] Inventors: William K. Timmons, Ann Arbor; George A. Koss, Dearborn Heights, both of Mich.

[73] Assignee: Ford Motor Company, Dearborn, Mich.

[21] Appl. No.: 21,752

[22] Filed: Mar. 19, 1979

[51] Int. Cl.² ............ B65G 15/00; B65G 47/26; B65G 29/00
[52] U.S. Cl. .................... 198/404; 198/456; 198/478; 198/480
[58] Field of Search ............ 198/456, 403, 404, 458, 198/478; 414/761, 762, 763

[56] References Cited

U.S. PATENT DOCUMENTS

| | | | |
|---|---|---|---|
| 1,970,749 | 8/1934 | Heichert | 198/404 |
| 3,967,723 | 7/1976 | Beckham | |
| 3,973,673 | 8/1976 | Ahluwalia | |

Primary Examiner—Robert B. Reeves
Assistant Examiner—Brian Bond
Attorney, Agent, or Firm—William E. Johnson; Keith L. Zerschling

[57] ABSTRACT

Disclosed herein is a device for turning over and for transferring a glass bracket from a first conveyor line to a second conveyor line. An end of the first conveyor line is offset both lengthwise and laterally from the beginning of the second conveyor line. The device also provides a means for locating the glass bracket as it is being moved between the two conveyor lines so that it can be positioned in a precise location on the second conveyor line.

12 Claims, 6 Drawing Figures

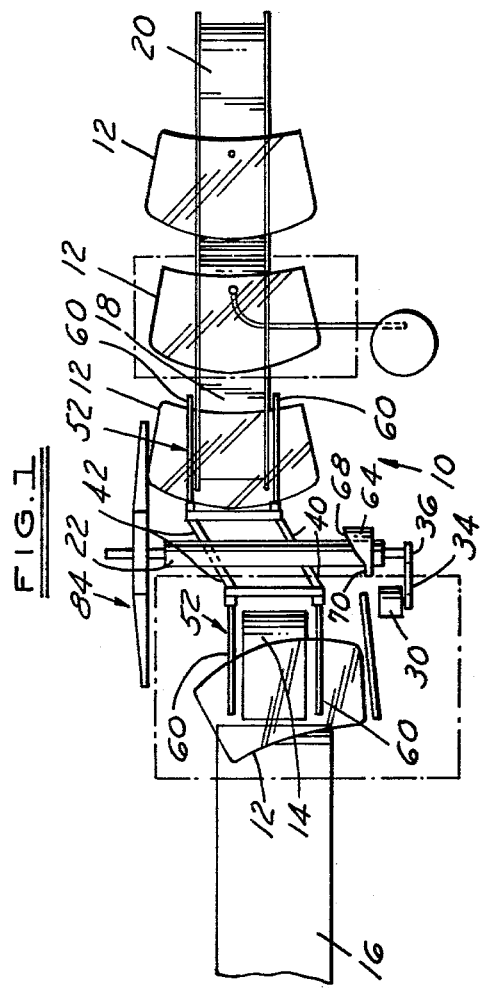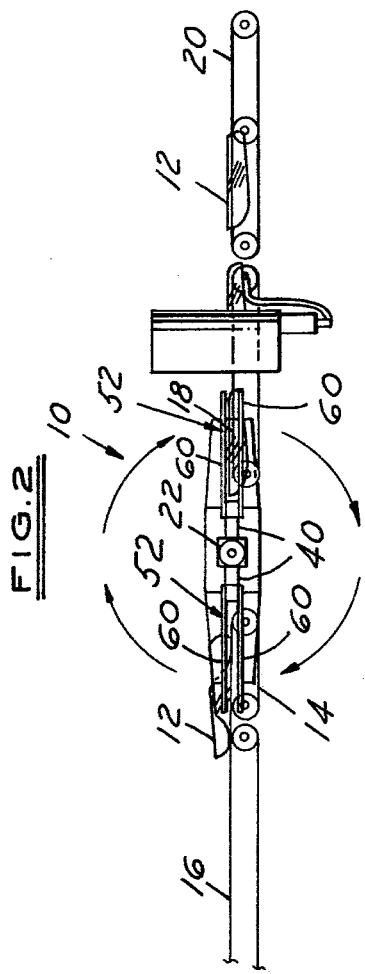

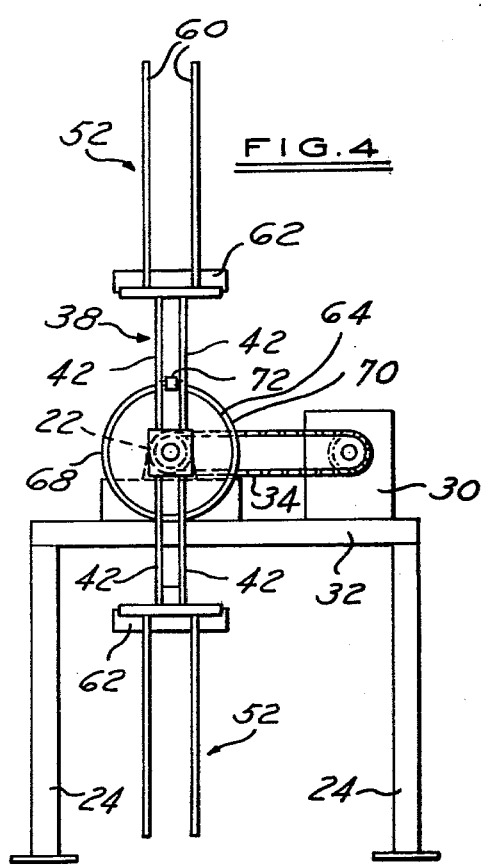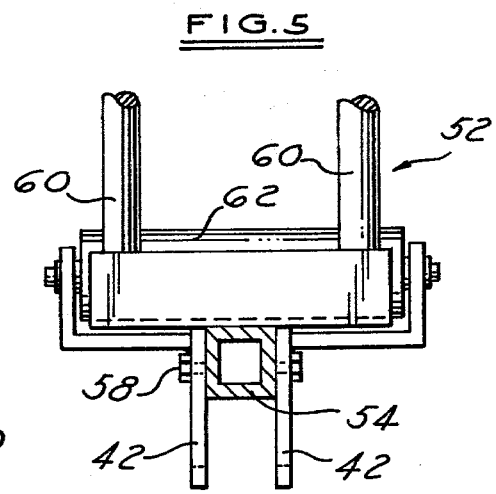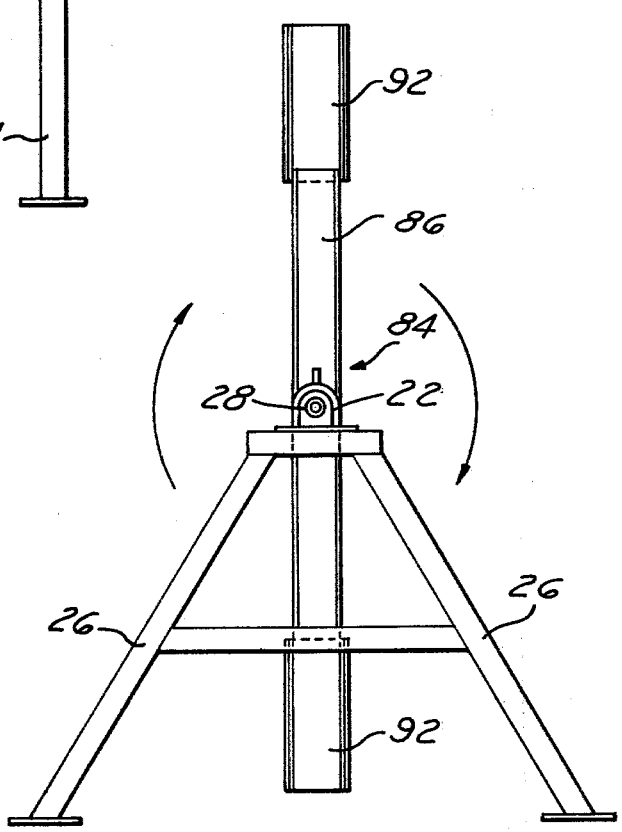

DEVICE FOR TURNING OVER AND FOR TRANSFERRING A GLASS BRACKET

BACKGROUND OF THE INVENTION AND PRIOR ART STATEMENT

The device for turning over and for transferring a glass bracket as disclosed herein was developed for the purpose of inverting and feeding a windshield to a device which applies thereto a button upon which a mirror can be installed. The mirror is installed after the windshield has been assembled in an opening of a motor vehicle.

In general, a windshield is, in its completed form, a curved piece of glass. The specific device developed and disclosed herein is one which takes a windshield from a first conveyor line in a position in which the curved portion thereof extends upwardly from the conveyor line, and thereafter transfers the windshield to a second conveyor line in a position with its curved surfaces facing downwardly. On the second conveyor line, the windshield is indexed into a device which applies a button thereto, the button providing a location at which a mirror may be secured to the windshield. In its preferred embodiment, the device also provides a means for aligning the windshield as it is moved from the first conveyor line to the second conveyor line so that the windshield is deposited on the second conveyor line in a predetermined position.

The most relevant prior art uncovered in a search of this subject matter appears to be U.S. Pat. Nos. 3,967,723 and 3,973,673. However, we feel that the subject matter of these two patents does not disclose or teach the structure specifically disclosed in this specification for the following reasons.

The U.S. Pat. No. 3,967,723 teaches a turnover apparatus for inverting a first sheet and placing it horizontally upon a second sheet as the sheets are carried along a horizontal path. The apparatus includes lifting arms for lifting and turning over the sheets and stacking them one upon the other. The lifting arms are moved through a series of steps in order to obtain the desired inversion and stacking.

In the U.S. Pat. No. 3,793,673, there is disclosed an apparatus for inverting and stacking matched pairs of moving glass sheets, one on the other. Again, the structure contains lifting and stacking arms which are moved in a coordinated fashion in order to turn over and thereafter stack glass sheets.

The device specifically disclosed in this specification does not use coordinated lifting and stacking arms for engaging the individual sheets, as will be apparent in the discussion set forth hereinbelow.

SUMMARY OF THE INVENTION

This invention relates to a device for turning over and for transferring a glass bracket and, more particularly, for a device for turning over and for transferring a glass bracket from a first conveyor line to a second conveyor line. In accordance with the teachings of this invention, an end of the first conveyor line is spaced lengthwise from and laterally offset from a beginning of the second conveyor line. In accordance with the general teaches of this invention, the device includes the following structure.

A central shaft is supported in a frame in such a position that it is located between and extending parallel to the end of the first conveyor line and the beginning of the second conveyor line. A motor is provided for rotating the central shaft.

A glass handling structure is pivotally secured to the central shaft in such a manner that the glass handling structure can pivot back and forth along the length of this shaft. The glass handling structure includes a glass receiving and holding structure thereon extending in a direction radially outwardly from the central shaft. The glass receiving and holding structure receives therein a glass bracket at the end of the first conveyor line and thereafter holds the glass bracket therein as the central shaft is rotated by the motor to move the glass receiving and holding structure from the end of the first conveyor line to the beginning of the second conveyor line.

A cam is positioned adjacent the central shaft. This cam provides a cam surface having a low position and a high position. There is a gradual transition between the low position and the high position of the cam. A cam follower is secured to the glass handling structure and this cam follower engages the cam surface of the cam. The action of the cam follower moving over the cam surface of the cam causes a pivoting of the glass handling structure and each of the glass receiving and holding structure associated therewith along the length of the central shaft. The angular movement along the length of the central shaft is from a first angular position with respect to the central shaft at the end of the first conveyor line to a second angular position with respect to the central shaft at the beginning of the second conveyor line. Other devices may be used for pivoting the glass handling structure between its angular positions with respect to the central shaft.

Structure is also provided for biasing the cam follower into engagement with the cam surface on the cam as the motor rotates the central shaft. Through this action, the glass handling structure is pivoted with respect to the central shaft during the period of time that the central shaft is rotated to move the glass handling means from the end of the first conveyor line to the beginning of the second conveyor line.

In accordance with more detailed teachings, a preferred device includes a locating structure positioned on the side of the device towards which the glass receiving and holding structure is pivoted when moved from the first angular position with respect to the central shaft to the second angular position with respect to the central shaft. The locating structure engages an edge of the glass bracket to thereby position and locate the glass bracket in a particular location in the glass receiving and holding structure of the glass handling structure. This action permits the glass bracket to be positioned precisely before it is delivered to the beginning of the second conveyor line.

BRIEF DESCRIPTION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of a specific embodiment when read in conjunction with the accompanying drawings, wherein like reference characters indicate like parts throughout the several figures, and in which:

FIG. 1 is a plan view of the device of the invention shown transferring glass brackets from the end of a first conveyor line to the beginning of a second conveyor line;

FIG. 2 is a side elevation view of the apparatus shown in FIG. 1;

FIG. 4 is a side elevation view of a portion of the device of this invention taken along line 4—4 of FIG. 3;

FIG. 5 is an elevation view of a small portion of the device and is taken along line 5—5 of FIG. 3;

FIG. 6 is a side elevation view of a portion of the device of FIG. 3 and is taken along lines 6—6 of FIG. 3.

DESCRIPTION OF THE PREFERRED EMBODIMENT CONSTRUCTION

Figure 3:
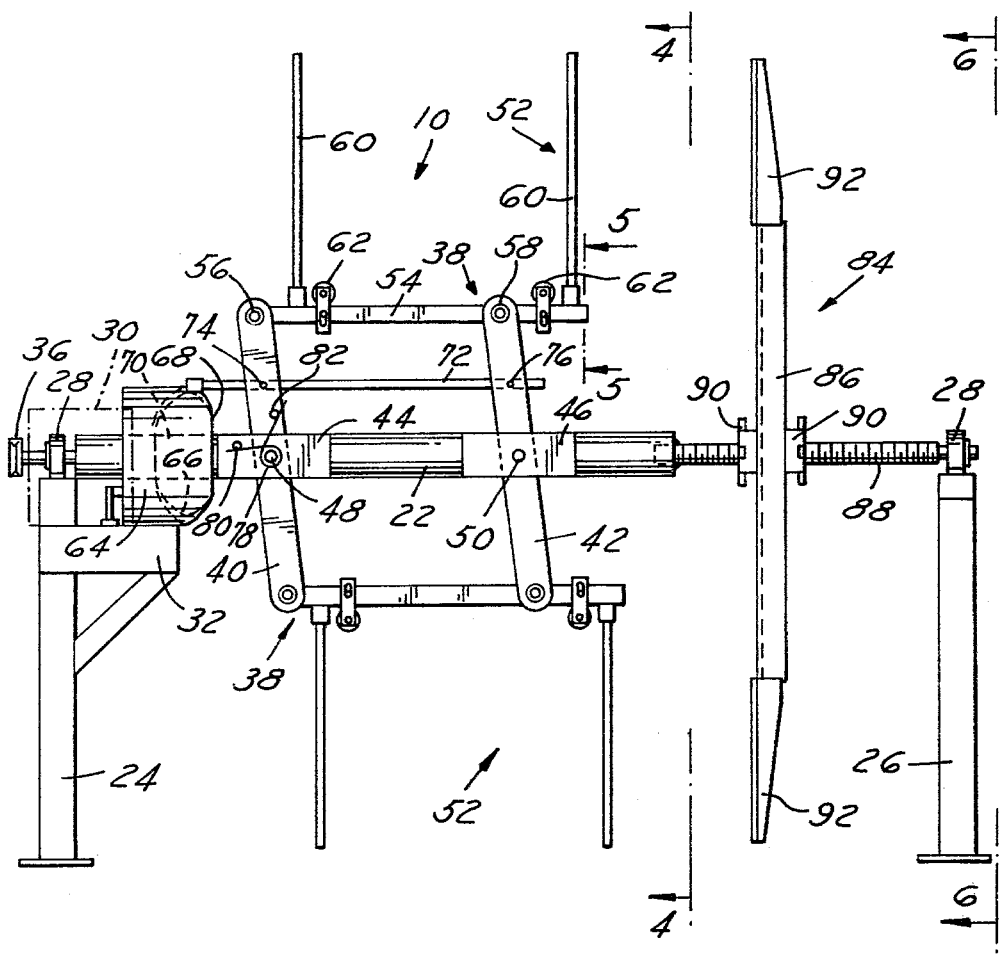
FIG. 3 is an elevational view of the device of this invention, and is a view taken looking from the beginning of the second conveyor line towards the end of the first conveyor line.

This specification discloses a device, generally identified by the numeral 10, for turning over and for transferring a glass bracket 12 from the end 14 of a first conveyor line 16 to the beginning 18 of a second conveyor line 20. As is best seen in FIG. 1, the end 14 of the first conveyor line 16 is spaced lengthwise and laterally offset from the beginning 18 of the second conveyor line 20.

As is best understood by viewing FIG. 3, the device of this invention includes a central shaft 22. A frame defined by upstanding members 24—24 and 26—26, rotatably mount the central shaft 22 by means of bearing members 28—28 in a position located between and extending parallel to the end 14 of the first conveyor line 16 and the beginning 18 of the second conveyor line 20.

As best seen in FIG. 4, a motor 30, supported on a table 32 which is supported by the upstanding members 24—24, is used to rotate the central shaft 22. In order to accomplish the rotation, the motor 30 is connected by means of a pulley belt 34 to a pulley 36 which is attached to the end of the shaft 22 extending beyond the bearing member 28 at the end hand side of FIG. 3. When power is applied to the motor 30, it in turn acts through pulley belt 34 to rotate the central shaft 22.

A glass handling structure, generally designated by the numeral 38, includes a pair of support members 40 and 42. Each of the support members 40 and 42 is made up of a pair of elements, such as the support members 42—42 shown in FIG. 4. These support members pass through slots 44 and 46, respectively, formed in the central shaft 22. A mid-portion of the support members 40—40 and 42—42 are pinned in the respective slots 44 and 46 by pins respectively designated by the numerals 48 and 50, seen best in FIG. 3, so that the support members are pivotable back and forth along the length of the shaft 22. This direction is to the right and to the left, as shown in FIG. 3. As is readily apparent in that Figure, the support members 40—40 and 42—42 are spaced away from one another at different positions along the length of the central shaft. As is also best seen in this Figure, the support members have paired and associated free end portions extending radially outwardly in the same direction from the central shaft. As viewed in that Figure, a pair of associated free ends extend upwardly from the central shaft 22 and a pair of associated free ends extend downwardly from the central shaft. The associated free end portions of the support members extend from the central shaft at a location spaced 180° of arc from the other pair of the associated free end portions of the support members.

The upper associated free end portions of the support members 40—40 and 42—42, as well as the associated lower free end portions of the same support members, each have associated therewith a glass receiving and holding structure, generally designated by the numeral 52. Both of these structures are built in a similar manner and only the upper structure will be described herein.

A bar 54 forms the base of each glass receiving and holding structure 52. The bar is connected by means of pivot pins 56 and 58 at two locations along its length respectively to the free ends of the support members 40—40 and the free ends of the support members 42—42. The bar 54 also has associated therewith at spaced positions along its length paired glass receiving and holding fingers 60—60. The bar 54 also has associated therewith a pair of spaced roller structures 62—62, the purpose of which will subsequently be described. As may best be seen in FIG. 2, a glass bracket 12 can slip between the two pair of spaced fingers 60—60 so as to be supportable within the glass receiving and holding structure 52.

A cam structure 64, best seen in FIGS. 3 and 4, is located on the table 32 which, in turn, is supported by the upstanding members 24—24. The cam structure 64 has a cam surface 66 thereon which has a high position 68 and a low position 70 associated therewith. The high and low positions are interconnected with a gradual transition between such positions.

A cam follower 72 is pivotally connected by pivot pins 74 and 76, respectively, to support members 40—40 and support members 42—42. A spring 78, shown only in FIG. 3, has free ends thereof associated with a fixed pin 80 located on the shaft 22 and a fixed pin 82 located on an upper support member 40 in order to bias the glass handling structure 38 in a direction which brings the cam follower 72 into engagement with the cam surface 66 of the cam structure 64. As the cam follower is moved over the cam surface 66, the glass handling structure 38 and glass receiving and holding structure 52 associated therewith is pivoted along the length of the central shaft 22 from a first angular position with respect to the central shaft at the end 14 of the first conveyor line 16 to a second angular position with respect to the central shaft at the beginning 18 of the second conveyor line 20, which is best illustrated in FIG. 1. The manner in which this pivoting is accomplished will be described in greater detail hereinbelow.

Other structure may be used for moving the glass handling structure between its angular positions with respect to the central shaft 22. For example, limit switches and pistons may be used to accomplish such movement.

In accordance with preferred teachings of this invention, the device 10 also includes structure for locating a glass bracket 12 within the glass receiving and holding structure 52 so that the glass bracket may be delivered to a precise location at the beginning 18 of the second conveyor 20. This structure is generally identified by the numeral 84, and is best seen in FIGS. 3 and 6.

The locating structure 84 includes a locating bar 86 adjustably positioned on a threaded portion 88 of the central shaft 22. Adjusting nuts 90—90 are alternately released, moved along the length of the threaded portion 88 of the central shaft 22, and secured tightly against the locating bar 86 in order to position it in a desired position along the aforesaid threaded portion. This adjustment permits one to locate various lengths of glass brackets within the glass receiving and holding structure 52. As shown in the preferred embodiment, the locating bar 86 has an upper portion and a lower portion aligned with and associated with respectively the upper glass receiving and holding structure and the lower glass receiving and holding structure. When the locating bar 86 is locked in a fixed position by the adjusting nuts 90—90, it rotates with the shaft 22 and, therefore, stays in a fixed location with respect to the associated glass receiving and holding structure. Glass locating pads 92—92 are provided at the free ends of the locating bar.

OPERATION

After the structure of the device has been described, its operation will now be covered. In accordance with the teachings of the preferred embodiment, the device for turning over and for transferring a glass bracket from a first conveyor line to a second conveyor line is used to take windshields which have just been manufactured, turn the same over, and put them into a device which applies a button to the central portion thereof, the button subsequently serving as a means for attachment of a mirror to the windshield.

In FIG. 1, the device 10 is shown receiving a glass bracket 12, in this case a windshield from the end 14 of a first conveyor line 16. The small conveyor 14 defining the end of the first conveyor line 16 moves the glass bracket 12 into the glass receiving and holding structure 52 which has been pre-positioned at the end of the first conveyor line so that its glass receiving and holding fingers 60—60 have fingers both on the right and left side of the glass bracket, as well as above and below the glass bracket. At the same time, a glass bracket 12 is being delivered by the other glass receiving and holding structure 52 of the device 10 to the beginning 18 of the second conveyor 20. Since conveyors are well known to those skilled in the art, no great detail thereof is disclosed herein.

After a new glass bracket 12 has been received in the glass receiving and holding structure 52 associated with the end 14 of the first conveyor line 16, and in a like manner a glass bracket 12 has been moved at the beginning 18 of the second conveyor line 22, current is supplied to the motor 30. This action causes the motor to operate pulley belt 34 and pulley 36 associated with the central shaft 22. As shown in FIG. 2, this action causes the glass receiving and holding structure at the end of 14 of the first conveyor 16 to be rotated upwardly, whereby the glass slides down between the glass receiving and holding fingers 60—60 and into engagement with the roller devices 62—62 associated with the glass receiving and holding structure 52.

Assumed in this discussion is the fact that the cam follower 72 associated with the glass handling structure 38 and glass receiving and holding structure 52 is originally biased by means of the spring 78 into contact with the low position 70 of the cam surface surface 66 of the cam structure 64. As the motor rotates the shaft 22 to move the glass receiving and holding structure 52 upwardly, as viewed in FIG. 2, the cam follower moves from the low position 70 towards the high position 68 of the cam surface 66, thus causing the upper glass receiving and holding structure 52 to be moved from left to right, as viewed in FIG. 3. This action causes a translation of this structure along the length of the shaft 22. As the device is being translated, the edge of the bracket held between the glass receiving and holding fingers 60—60 will come into contact with the locating pad 92 of the associated portion of the locating bar 86. As further translation of the structure occurs, the engagement of the glass bracket with the locating pad 92 will cause the glass bracket to move on the roller device 62—62 relative to the glass receiving and holding structure which is still being translated. In this manner, the glass bracket may be located at a precise position with respect to the glass receiving and holding structure and, thus, will be located at a precise position with respect to the beginning 18 of the second conveyor line 20 when it reaches that position.

Power to the motor 30 is terminated after the central shaft 22 has been rotated to a position in which the cam follower 72 has reached the high position 68 of the cam surface 66 and the glass bracket is located on the beginning 18 of the second conveyor line 20. When this position is reached, the glass is removed by the second conveyor line and a new glass bracket is positioned in the glass receiving and holding structure which has now been moved to the end 14 of the first conveyor line 16.

The cycle of loading, transferring and delivery is repeated from the next half rotation of the shaft 22. However, in this case the cam follower 72 will move from the high position 68 to the low position 70 as it is rotated underneath the shaft 22. This action is readily apparent from the drawings.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A device for turning over and for transferring a glass bracket from a first conveyor line to a second conveyor line, an end of the first conveyor line being spaced lengthwise from and laterally offset from a beginning of the second conveyor line, which device comprises:

a central shaft;
frame means for supporting said central shaft in a position located between and extending parallel to the end of the first conveyor line and the beginning of the second conveyor line;
motor means for rotating said central shaft;
glass handling means pivotally secured to said central shaft in such a manner that said glass handling means can pivot back and forth along the length of said shaft, said glass handling means including glass receiving and holding means thereon extending in a direction radially outwardly from said central shaft, said glass receiving and holding means for receiving therein a glass bracket at the end of the first conveyor line and for holding the glass bracket as said central shaft is rotated by said motor means to move a glass receiving and holding means from the end of the first conveyor line to the beginning of the second conveyor line; and
positioning means functionable with said glass handling means for pivoting said glass handling means and each of said glass receiving and holding means associated therewith along the length of said central shaft from a first angular position with respect to said central shaft at the end of the first conveyor line to a second angular position with respect to said central shaft at the beginning of the second conveyor line.

2. A device for turning over and for transferring a glass bracket from a first conveyor line to a second conveyor line, an end of the first conveyor line being spaced lengthwise from and laterally offset from a beginning of the second conveyor line, which device comprises:

a central shaft;

frame means for supporting said central shaft in a position located between and extending parallel to the end of the first conveyor line and the beginning of the second conveyor line;

motor means for rotating said central shaft;

glass handling means pivotally secured to said central shaft in such a manner that said glass handling means can pivot back and forth along the length of said shaft, said glass handling means including glass receiving and holding means thereon extending in a direction radially outwardly from said central shaft, said glass receiving and holding means for receiving therein a glass bracket at the end of the first conveyor line and for holding the glass bracket as said central shaft is rotated by said motor means to move a glass receiving and holding means from the end of the first conveyor line to the beginning of the second conveyor line; and cam means positioned adjacent said central shaft said cam means for providing a cam surface having a low position and a high position with a gradual transition between such positions;

cam follower means secured to said glass handling means for engaging said cam means, said cam follower means for pivoting said glass handling means and each of said glass receiving and holding means associated therewith along the length of said central shaft from a first angular position with respect to said central shaft at the end of the first conveyor line to a second angular position with respect to said central shaft at the beginning of the second conveyor line; and means for pressing said cam follower means into engagement with said cam means as said motor means rotates said central shaft.

3. The device of claim 2 wherein: said glass handling means includes a pair of support members, one support member being pivotally connected at its central point to said central shaft at a first position along said central shaft, and said other support member being pivotally connected at its central point to said central shaft at a second position along said central shaft spaced from said first position, said support members having paired and associated free end portions extending radially outwardly in the same directions from said central shaft with each pair of said associated free end portions of said support members extending from said central shaft at a location spaced 180° of arc from the other pair of said associated free end portions of said support members.

4. The device of claim 3 wherein: said glass receiving and holding means are pivotally attached to each pair of said associated free end portions of said support members.

5. The device of claim 4 wherein: said glass receiving and holding means includes a bar pivotally connected to and extending between each pair of said associated free end portions of said support members, and further includes a pair of outwardly extending glass receiving and holding fingers positioned at two different locations along the length of said bar, a glass bracket being receivable between said pair of glass receiving and holding fingers.

6. The device of claims 2, 3, 4 or 5 in which said cam means has a cam surface of circular configuration with said low position lying 180° of arc along said circular cam surface from said high position.

7. A device for turning over and for transferring a glass bracket from a first conveyor line to a second conveyor line, an end of the first conveyor line being spaced lengthwise from and laterally offset from a beginning of the second conveyor line, the device also aligning a glass bracket so that the glass bracket will be placed in a predetermined position in the second conveyor line, which device comprises:

a central shaft;

frame means for supporting said central shaft in a position located between and extending parallel to the end of the first conveyor line and the beginning of the second conveyor line;

motor means for rotating said central shaft;

glass handling means pivotally secured to said central shaft in such a manner that said glass handling means can pivot back and forth along the length of said shaft, said glass handling means including glass receiving and holding means thereon extending in a direction radially outwardly from said central shaft, said glass receiving and holding means for receiving therein a glass bracket at the end of the first conveyor line and for holding the glass bracket as said central shaft is rotated by said motor means to move a glass receiving and holding means from the end of the first conveyor line to the beginning of the second conveyor line;

cam means positioned adjacent said central shaft, said cam means for providing a cam surface having a low position and a high position with a gradual transition between such positions;

cam follower means secured to said glass handling means for engaging said cam means, said cam follower means for pivoting said glass handling means and each of said glass receiving and holding means associated therewith along the length of said central shaft from a first angular position with respect to said central shaft at the end of the first conveyor line to a second angular position with respect to said central shaft at the beginning of the second conveyor line;

means for pressing said cam follower means into engagement with said cam means as said motor means rotates said central shaft; and locating means positioned on the side of said device towards which said glass receiving and holding means is moved when moved from said first angular position with respect to said central shaft to said second angular position with respect to said central shaft, said locating means engaging an edge of the glass bracket to position the glass bracket in a particular location prior to delivery to the second conveyor line.

8. The device of claim 7 wherein: said glass handling means includes a pair of support members, one support member being pivotally connected at its central point to said central shaft at a first position along said central shaft, and said other support member being pivotally connected at its central point to said central shaft at a second position along said central shaft spaced from said first position, said support members having paired and associated free end portions extending radially outwardly in the same directions from said central shaft with each pair of said associated free end portions of said support members extending from said central shaft at a location spaced 180° of arc from the other pair of said associated free end portions of said support members.

9. The device of claim 8 wherein: said glass receiving and holding means are pivotally attached to each pair of said associated free end portions of said support members.

10. The device of claim 9 wherein: said glass receiving and holding means includes a bar pivotally connected to and extending between each pair of said associated free end portions of said support members, and further includes a pair of outwardly extending glass receiving and holding fingers positioned at two different locations along the length of said bar, a glass bracket being receivable between a pair of glass receiving and holding fingers.

11. The device of claims 7, 8, 9 or 10 in which said cam means has a cam surface of circular configuration with said low position lying 180° of arc along said circular cam surface from said high position.

12. The device of claims 7, 8, 9, 10 or 11 wherein: said locating means is a locating bar mounted at a central location thereof to said shaft, said locating bar extending outwardly from said central shaft in the same directions as said glass handling means.

* * * * *